United States Patent [19]

Higgins et al.

[11] Patent Number: 4,596,727
[45] Date of Patent: Jun. 24, 1986

[54] CELLULOSIC CASING WITH COATING COMPRISING CELLULOSE ETHER, OIL AND WATER-INSOLUBLE ALKYLENE OXIDE ADDUCT OF FATTY ACIDS

[75] Inventors: Thomas E. Higgins, Riverside; Ditlev P. D. Madsen, Palos Park, both of Ill.

[73] Assignee: Union Carbide Corporation, Danbury, Conn.

[21] Appl. No.: 573,367

[22] Filed: Jan. 26, 1984

Related U.S. Application Data

[63] Continuation-in-part of Ser. No. 538,892, Oct. 4, 1983, abandoned.

[51] Int. Cl.$^4$ .............................................. A22C 13/00
[52] U.S. Cl. .................................... 428/36; 138/118.1

[58] Field of Search ..................................... 428/35, 36

[56] References Cited

U.S. PATENT DOCUMENTS 3,887,713  6/1975  Rasmussen .......................... 426/135
4,161,968  7/1979  Rasmussen .......................... 138/118.1
4,377,187  3/1983  Chiu ................................. 138/118.1

Primary Examiner—Christopher A. Henderson
Attorney, Agent, or Firm—D. L. Carlson

[57] ABSTRACT

Shirred tubular cellulosic food casing having a release coating comprising a water-insoluble ethoxylated glyceride coating on the internal surface thereof. The casing provides ease of peelability, ease of shirred stick deshirrability, as well as enhanced shirred stick coherency.

10 Claims, No Drawings

CELLULOSIC CASING WITH COATING COMPRISING CELLULOSE ETHER, OIL AND WATER-INSOLUBLE ALKYLENE OXIDE ADDUCT OF FATTY ACIDS

This application is a continuation-in-part of co-pending U.S. application Ser. No. 538,892 filed Oct. 4, 1983, now abandoned.

FIELD OF THE INVENTION

The present invention relates generally to peelable food casings and, more particularly, to such casings in the form of highly coherent, readily deshirrable shirred sticks together with a method of manufacture thereof.

BACKGROUND OF THE INVENTION

Food casings used in the processed food industry are generally thin-walled tubing of various diameters prepared from regenerated cellulose, cellulose derivatives, alginates, collagen and the like. Fibrous webs may also be embedded in these food casings and such casings are commonly termed in the art "fibrous food casings". In general, both fibrous and non-fibrous casings have multifunctional uses in that they may be employed as containers during the processing of the food product encased therein and also serve as a protective wrapping for the finished product. In the sausage meat industry, however, the preparation of various types of sausages ranging in size from smaller sausages, such as frankfurters, up to the larger sizes, such as bolognas, usually involves removing the casing from the processed meat prior to final packaging. Peeling the casing from the processed sausage has presented major problems, particularly in the production of frankfurters where large numbers of the product are involved and the desire in commercial operations is to use high-speed, automatic stuffing and peeling machines.

When the casing is removed from the meat mass, there is occasionally a tendency for some meat to adhere to the casing and be torn from the sausage with the casing, thereby causing surface marring of the sausage. In other instances, variations in the meat emulsion formulations or in the processing conditions can result in a degree of adherence of the casing to the product which hinders rapid removal of the casing from the product encased therein. The use of high speed, automatic peeling machines in commercial operations as, for example, disclosed in U.S. Pat. Nos. 2,424,346 to Wilcoxon; 2,514,660 to McClure et al.; 2,686,927 to Greg; and 2,757,409 to Parkers et al., makes it particularly essential that there be minimal resistance to the separation of casing from sausage, or the product will jam at the peeler or go through unpeeled. Less than complete removal of the casing necessitates the expense of hand sorting and peeling.

Heretofore many attempts have been made to provide casings having easy release characteristics. It is known in the art, as disclosed, for example, in U.S. Pat. Nos. 2,901,358 to Underwood et al.; 3,106,471 and 3,158,492 to Firth; 3,307,956 to Chiu et al.; 3,442,663 to Turbak; 3,558,331 to Tarika; and 3,898,348 to Chiu et al., that the application of certain types of coatings to the inside wall of food casings may afford improvement in the release characteristics of the casing from the encased sausage product.

Food casings having good release characteristics sometimes present other problems, unrelated to the release property, prior to, or at the time of, the automatic food stuffing operation. Casings which are generally utilized to encase food product such as vienna sausage, frankfurters and the like, are typically fabricated in continuous lengths, measuring from about 55 feet to 160 feet or longer in length, and from about ⅝ inch to 2-½ inches or more in flat width, which are formed into shirred casing sticks. The casing is stored, prior to use, in the form of these shirred or pleated casing sticks measuring 1 to 2 feet in length. Two properties of the shirred casing sticks are particularly important, namely the "coherency" of the stick, which relates to the stick's capacity to maintain its integrity as a shirred stick and not to "break" into multiple shirred pieces, and the "deshirr capacity" of the stick, which relates to the ability to depleat the shirred stick just prior to stuffing without applying excessive force that would cause the casing to tear. It has been found that some release coatings as, for example, disclosed in U.S. Pat. No. 3,451,827 to Bridgeford, when applied to the inside surface of the food casing, interferes with mechanical shirring of the casing or the mechanical stuffing of shirred casing. Other release coatings, such as those disclosed in U.S. Pat. 3,898,348 to Chiu, while providing excellent release properties, at times leave something to be desired in terms of shirred stick coherency.

OBJECTS OF THE INVENTION

It is, therefore, an object of the present invention to provide a coated tubular cellulosic food casing which is suitable for the encasing and processing of food products, and which is readily released from the processed food product encased therein by use of high speed, automatic sausage peeling machines.

It is another object of this invention to provide a coated tubular cellulosic food casing, and method of producing the same, which provides an improved coherency when the casing is shirred, and which can be readily deshirred with a deshirring force that will minimize or eliminate the tearing of casing during deshirring.

Other objects and advantages of this invention will become apparent from the ensuing discussion thereof.

SUMMARY OF THE INVENTION

In one aspect, the present invention relates to a tubular cellulosic casing having a coating over the internal surface thereof, said coating comprising at least three components, including a first component being a water-soluble cellulose ether, and a second component being at least one water insoluble alkylene oxide adduct of fatty acids or fatty acid partial esters, and a third component being a member selected from the group consisting of animal and vegetable oils, mineral oil and silicone oils, said first component of said coating being present in an amount of from about 0.005 mg/in$^2$ to about 0.07 mg/in$^2$ of internal casing surface, and said second component being present in an amount of from about 0.005 to about 0.1 mg/in$^2$ of internal casing surface, and said third component being present in said coating in an amount of from about 0.001 to about 3 mg/in$^2$ of casing surface, said casing being suitable for stuffing with food products and being readily peelable from food products processed therein.

In another aspect, the invention relates to a method of preparing a coated tubular cellulosic food casing which comprises applying to a tubular cellulosic food casing a coating comprising at least the above-mentioned three components.

In still another aspect, the present invention relates to a method of preparing an encased foodstuff which includes the step of stuffing the above coated casing with food product.

DETAILED DESCRIPTION OF THE INVENTION

Casing produced in accordance with the method of the present invention can be utilized in the preparation of foodstuffs from a wide range of formulations and processing conditions, and then can be readily removed from the processed foodstuff using high-speed, automatic peeling machines without scarring or scuffing the surface thereof, and with high peeling efficiency.

The food casings of the present invention may be prepared from tubular casings, particularly casings of regenerated cellulose and fibrous reinforced regenerated cellulose that are fabricated in accordance with any of the known commercial methods, by applying a coating composition to the internal surface thereof, said coating composition containing a component or components which will be more fully described hereinafter.

Lengths of casing are generally shirred or pleated into shirred casing sticks for ease of storage, handling and subsequent use on automatic stuffing machines. Typical methods and apparatus employed in the shirring of lengths of tubular casing to obtain shirred casing sticks are disclosed, for example, in U.S. Pat. No. 2,984,574 to Matecki and 3,110,058 to Marbach, the disclosures of both patents being incorporated herein by reference.

It is well known that the shirred casing stick must be readily extended or deshirred without tearing or other damage when stuffed with a food emulsion, yet the shirred stick must exhibit sufficient cohesive strength or "coherency" to be self-sustaining and permit handling thereof without breaking, and to insure trouble-free operation with manual and automatic food stuffing apparatus.

It has been found, however, that when certain water-soluble ethers are employed for imparting release characteristics to food casing prepared in the form of shirred casing sticks, the pleats of the shirred casing, which are nested together and interlocked, tend to adhere to each other (so-called "blocking of pleats") and the casing subsequently will be damaged during stuffing with meat emulsion.

One essential component of the coating useful in accordance with the present invention is a water-soluble cellulose ether or a mixture of water-soluble cellulose ethers. Typical water-soluble cellulose ethers which may be employed are the non-ionic water-soluble alkyl and hydroxyalkylcellulose ethers such as, for example, methylcellulose, hydroxypropyl methylcellulose, hydroxypropylcellulose, ethyl methylcellulose, hydroxyethylcellulose and ethyl hydroxyethylcellulose and preferably the anionic water-soluble cellulose ethers such as, for example, carboxymethylcellulose and carboxymethylhydroxyethylcellulose. Commercially, carboxymethylcellulose (also referred to herein as "CMC") and carboxymethyl hydroxyethylcellulose are almost always sold as the sodium salt, and it is well established trade practice not to refer to the commercial product as the sodium salt. For the purpose of this application, reference to these materials shall include the sodium salt and other alkali metal salts thereof. Also suitable are the alkali soluble cellulose ethers, as, for example, alkali soluble methylcellulose and hydroxyethylcellulose, and for the purpose of this application the definition of water soluble is intended to include such alkali soluble cellulose ethers.

The amount of water-soluble cellulose ether present on the internal surface of food casing, which is necessary to impart desired release characteristics, can vary over a wide range though very small quantities are actually required. In general, tubular casings of the present invention will contain from about 0.005 milligram of cellulose ether per square inch of casing surface (0.005 mg/in$^2$), to about 0.07 mg/in$^2$ and preferably between about 0.025 mg/in$^2$ and about 0.035 mg/in$^2$ on the internal casing surface. Above 0.07 mg/in$^2$ of cellulose ether, so-called "fatting out" or surface rendering of fatty constituents of the stuffed product is likely.

Another essential component of the coating useful in accordance with the present invention is one or more water insoluble alkylene oxide adducts of fatty acids or fatty acid partial esters, or mixtures thereof, wherein the alkylene oxide moiety contains one to four carbon atoms and preferably two carbons. The adducts are preferably alkoxylated glycerides, more preferably ethoxylated mono- and di-glycerides, and most preferably ethoxylated monoglycerides, and mixtures thereof. However, other water insoluble adducts falling within the above mentioned class of fatty acids or fatty acid partial esters, are seen to be within the scope of the present invention. As used herein, the term "water insoluble" as it refers to the adducts of the present invention is intended to designate any such adduct having a hydrophilic-lipophilic balance (HLB) number of between about 10 and about 13, more preferably between about 11 and about 13. The water insoluble alkylene oxide adducts of fatty acids or fatty acid partial esters, within the above-specified range of HLB numbers are well known in the art and are readily commercially available. A particularly preferred class of composition within the scope of the present invention is that represented by the formulas:

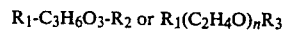

$$R_1\text{-}C_3H_6O_3\text{-}R_2 \text{ or } R_1(C_2H_4O)_nR_3$$

wherein $R_1$ is a long chain fatty acid radical having 10 to 24 carbon atoms; and $R_2$ is $\text{-}(C_2H_4O)_nH$ wherein n is an integer from 1 to 40, and wherein $R_3$ is hydrogen or a long chain fatty acid radical having 10 to 24 carbon atoms. Such particularly preferred compounds are well-known and more fully described, together with their method of preparation in U.S Pat. No. 3,490,918, incorporated herein by reference.

A particularly preferred adduct within this class is commercially available as a "Mazol 80MG", a product of Mazer Chemicals, Inc. Other useful adducts include the following: polyoxyethylene (5) sorbitan monooleate (HLB # = 10.0); polyethylene glycol (400) dilaurate (HLB # = 10.0); polyethylene glycol (400) monostearate (HLB # = 11.2); polyethylene glycol (400) monooleate (HLB # = 11.0); polyethylene glycol (400) monotallate (HLB # = 11.0); polyethylene glycol (4000) monostearate (HLB # = 13.0); and the like.

The adduct or mixture of adducts is generally employed on the tubular casings in an amount of from about 0.005 to about 0.1 mg/in$^2$ of adduct on the internal casing surface, preferably from about 0.005 to about 0.027 mg/in$^2$ of adduct. When the adduct or mixture of adducts is present in an amount below about 0.005 mg/in$^2$, blocking of pleats and subsequent tearing of casing during deshirring are likely, whereas an adduct level above 0.1 mg/in$^2$ is likely to reduce shirred stick coherency.

A third essential component of the coating useful in the present invention is an oil selected from the group consisting of animal and vegetable oils, mineral oil and silicone oils. This third component can be applied to the casing in the coating composition or from a separate stream.

The amount of the third component present on the internal surface of the casing should be between about 0.001 and about 3 mg/in$^2$, preferably between about 0.001 and about 0.5 mg/in$^2$ on the casing surface, more preferably between about 0.001 and about 0.05 mg/in$^2$.

Materials suitable for use as the third component include refined animal and vegetable oils that are normally liquid at room temperature or have a melting point below about 100° F., and food grade mineral oil and silicone oils, but preferably mineral oil.

Application of the cellulose ether coating to the internal casing surface can be accomplished by using any one of a number of well known methods. Thus, for example, a coating composition containing the water-soluble cellulose ether can be introduced into the casing in the form of a "slug" of liquid, and advancing the casing past the liquid slug coats the inner surface thereof. Alternatively, a preferred method is application of an aqueous coating composition to the internal surface of the casing through a hollow mandrel over which the casing is advancing as, for example, the mandrel of a casing shirring machine in a manner similar to that described in U.S. Pat. No. 3,451,827 to Bridgeford.

It has been found that aqueous solutions of cellulose ethers are most suitable and preferred for preparation of coated tubular fibrous and non-fibrous casings of the present invention. These aqueous solutions afford a more uniform coating of cellulose ether and great control of the amount of cellulose ether and other components of the desired coating applied to the surface of the casing. However, application of a coating composition containing the water-soluble cellulose ether in suspension may be satisfactory for preparing casings used for certain applications.

The aqueous coating compositions useful in the present invention may also optionally contain, and preferably do contain, a polyol in an amount of from 10 to 90 wt. percent based on the weight of the coating solution. The polyol contains three to six carbon atoms and at least 2 hydroxyl groups. Typical polyols that can be employed are glycerol, propylene glycol, triethylene glycol and sorbitol. The amount of polyol that may be used is, in general, dependent on the desired viscosity of the coating composition and also on the amount of water that may be tolerated by the tubular casings being treated, as hereinafter discussed more fully. Among other functions, the polyols act as a "humectant" in the casing itself as is known and discussed in U.S. Pat. No. 3,981,041, incorporated herein by reference.

A number of factors are known to affect the preparation of shirred casing sticks and the suitability of the shirred casing sticks for use in the processing of various types of food products, particularly when high speed automatic equipment is employed in the shirring and stuffing operations. It is well known in the art, for example, that if the moisture content of the tubular casing is greater than about 25% by weight, difficulty is experienced in the formation of proper pleat and shirring patterns, and "bowing and snaking" of the resulting shirred casing stick will occur, thereby making stuffing operations more difficult. Further, it has been found that when water is applied to the casing during the shirring process, application of excess amounts of water will cause the casing to seize on the shirring mandrel, thus making further processing thereof very difficult, if not impossible.

Accordingly, when it is desired to apply the coating compositions described herein, as, for example, while the tubular casing is passing over a shirring mandrel prior to or during the shirring operation, it has been found that the amount of coating composition applied while treating the internal surface of the casing with a water-soluble cellulose ether must be controlled to limit the amount of water added to the casing. In accordance with the present invention, the coated casing should have a water content of between about 11.0 wt. percent and 25.0 wt. percent, preferably between about 14.0 wt. percent and about 22.0 wt. percent, and more preferably between 15.0 and 19.0 wt. percent, in order to avoid the above mentioned problems while optimizing stick coherency.

It is also particularly advantageous to avoid application of more coating composition than can be imbibed by the casing in order to prevent excess coating composition from being lost and wasted, or from accumulating in localized areas of the shirred sticks with resulting detrimental effects thereto. Generally, not more than about 20 mg/in$^2$ and preferably not more than about 5 mg/in$^2$ of coating composition should be applied to the internal surface of the tubular casing.

Another factor known to be especially important as it affects the suitability of shirred casing sticks for use with automatic food stuffing equipment, as, for example employed in the preparation of products such as frankfurters, is the durability or coherency of the shirred stick as a self-sustaining article. A disjoinder or break in the shirred stick prior to mounting on the stuffing apparatus makes the stick unsuitable for use. Accordingly, any treatment, such as the application of a coating to a tubular food casing that is to be formed into shirred casing sticks, must not detrimentally affect the coherency of the shirred stick, and the coating material and method of application thereof, must be considered in light of its effect on coherency.

Following is a description of the coherency test that is used for determining this important characteristic of shirred casing sticks.

Coherency Test Method

Coherency of a casing stick is determined by measuring the bending moment in inch-pounds at the breaking of a stick. A casing stick is cradled on two V-notched support brackets secured on a base plate and spaced apart a distance (D), about 80% to 90% of the length of the casing stick being tested. A pressure member having V-notched struts spaced apart a distance of D less 4 inches is centrally lowered onto the top of the casing stick. A downward pressure is provided by a motor operated rack and pinion linkage to a force gauge (such as a Hunter Force Indicator, Model L-IM with a "Hold at Maximum Device") that is secured centrally to the pressure member. The force is increasingly applied until the casing stick breaks. The force reading P in pounds is noted. The bending moment in inch pounds at break on the apparatus is equal to $P/2 \times 2$ inches, and thus the force reading P equates to inch-pounds of bending moment required to break the casing stick. In general, a coherency of at least about 1.0 inch-pound is required for the casing stick to be considered to have an acceptable coherence, and a coherency of at least about 2.5 inch-pounds or higher is especially suitable and preferred.

Another factor that is important in affecting the suitability of shirred casing sticks for use with automatic food stuffing equipment is the deshirring force required to deshirr the casing. If the required deshirring force is excessive, tearing of casing will result during deshirring. A deshirring force test, as described below, was employed in evaluating the coated casings of the present invention.

Deshirring Force Test

This test was used to determine the force required to deshirr a selected stick of casing in the direction in which it would be stuffed. The apparatus used consists of a force gauge (Model L-1, Ametek Testing Equipment Systems, measuring 0-1 pounds marked off in 0.01 lb. increments) and a pulley with an attached reeling device which is used to pull and deshirr the casing for the shirred stick. Using this equipment, a casing stick is pulled and deshirred at a constant speed of 45 inches per minute.

The test procedure for the deshirring force test consists of the following steps:

The invention will become more clear when considered together with the following examples which are set forth as being merely illustrative of the invention and which are not intended, in any manner, to be limitative thereof. Unless otherwise indicated, all parts and percentages are by weight.

EXAMPLE 1

Several coating formulations within the scope of the present invention were prepared having the compositions identified in Table I below. A comparative formulation, identified in Table I below as Comparative Formulation A, was prepared using "Tween-80" as a coating additive, as more fully described in U.S. Pat. No. 3,898,348 to Chiu, and it was prepared according to the procedure described below.

As more fully described in Table I below, Formulations 1 to 3 of the present invention employed "Mazol 80 MG" as a coating additive, whereas Formulation 4 of the present invention employed "Aldosperse MS 20" and Formulation 5 employed "Pegosperse 400 MO" as coating additives.

In preparing the formulations described in Table I below, the following procedure was followed:

First, the carboxymethylcellulose was mixed with a portion of the water in a blender and then the resulting mixture was transferred to a beaker and mixed using a high-shear laboratory mixer.

TABLE I

| | Coating Formulation | | | | | | | | |
|---|---|---|---|---|---|---|---|---|---|
| Ingred., wt. % | Comp. Form. A | Comp. Form. B | Comp. Form. C | Comp. Form. D | Form. 1 | Form. 2 | Form. 3 | Form. 4 | Form. 5 |
| Water | 45.70 | 71.30 | 45.00 | 45.00 | 46.53 | 66.28 | 71.30 | 45.00 | 45.00 |
| Propylene glycol | 48.15 | 22.55 | 47.90 | 47.90 | 48.15 | 28.40 | 23.38 | 49.00 | 49.00 |
| Carboxymethyl cellulose | 0.90 | 0.90 | 0.85 | 0.85 | 0.90 | 0.90 | 0.90 | 0.85 | 0.85 |
| Mineral oil | 4.00 | 4.00 | 5.00 | 5.00 | 4.00 | 4.00 | 4.00 | 5.00 | 5.00 |
| Coating Additive | 1.25* | 0.50** 0.75****** | 1.25* | 1.25* | 0.42*** | 0.42*** | 0.42*** | 0.15**** | 0.15***** |

*"Tween-80", a product of Atlas-ICI Chemical, polyoxyethylene (20) sorbitan monooleate having an HLB of 15.0.
**"S-Maz 80K", a product of Mazer Chemicals, Inc., sorbitan monooleate having an HLB of 4.3.
***"Mazol 80 MG", a product of Mazer Chemicals, Inc., a mixture of ethoxylated monoglycerides described by structural formula hereinabove, having an HLB of 11.0.
****"Aldosperse MS 20", a product of Glyco Chemicals, Inc., polyoxyethylene 20 glycerol monostearate, having an HLB of about 13.
*****"Pegosperse 400 MO", a product of Glyco Chemicals, Inc., polyethylene glycol (400) monooleate, having an HLB of 11.0.
******"T-Maz 80K", a product of Mazer Chemicals, Inc., polyoxyethylene (20) sorbitan monooleate, having an HLB of 15.0.
Although Comparative Formulation C and Comparative Formulation D have identical compositions, they were used to coat casing obtained from different batches. The casing batch used for the casing coated with Comparative Formulation C corresponded to the batch used for the casing coated with Formulation 4, whereas that for Comparative Formulation D corresponded to that used for formulation 5. It is well-established that comparisons should be based on the same batch of casing.

(a) From the selected shirred stick, an approximately 2 inch sample is removed from the open end, the middle, and the closed end of the stick.
(b) The end of each stick sample is deshirred by hand approximately 1 inch. Tape is wrapped around the cone portion of the stick to ensure that the casing will not deshirr at that cone position.
(c) The deshirred portion of the stick is clamped to the force gauge using a spring clamp and a string is attached to the gauge. The other end of the stick is clamped to the reeling device attached to the pulley.
(d) The reeling device and pulley mechanism is started and the casing deshirring begins. Readings are taken to measure the deshirring force on the force gauge at two intervals to provide a most frequent ("modal") force reading. In general, a modal deshirr force of less than 0.65 pound is preferred and a force less than 0.55 pound is more preferred.

Next, the other ingredients were added sequentially as follows: coating additive (as specified in Table I above), mineral oil, additional water to provide the total water as specified in Table I, and propylene glycol. Lastly, the resulting mixture was mixed for ten minutes and then homogenized twice on a Gaulin homogenizer at 4,000 psi. Each formulation was then thoroughly mixed just prior to coating the casing sample in order to insure homogeneity at the time of use.

Commercially produced cellulosic casing samples, having a flat width measuring about 1.2 inches, were used to prepare the casings of this example. These casings were shirred on an apparatus such as that disclosed in U.S. Pat. Nos. 2,984,574 to Matecki and No. 3,110,058 to Marbach. As each length of casing was being shirred, the particular coating formulation from Table I above was applied in the amount of 3.5 mg of coating composition per square inch of internal surface of casing by metering through the shirring mandrel along with the stream of inflation air.

The coated shirred sticks were then tested for the properties specified in Table II.

In comparing results, it is necessary to compare casings made with a Test Formulation with casings made with a Comparative Formulation at the same time from the same lot of casing. Such comparisons are indicated in the following discussion.

TABLE II

| Formulations | Coating and Coated Casing Properties | | | | | | | | |
|---|---|---|---|---|---|---|---|---|---|
| | Comp. Form. A | Comp. Form. B | Comp. Form. C | Comp. Form. D | Form. 1 | Form. 2 | Form. 3 | Form. 4 | Form. 5 |
| Coherency (inch-lbs.) | 2.32 | 1.18 | 1.24 | 1.52 | 2.95 | 4.11 | 2.44 | 2.22 | 2.31 |
| Modal Deshirr force (lbs.) | 0.361 | 0.334 | 0.35 | 0.320 | 0.349 | 0.338 | 0.293 | 0.400 | 0.40 |
| Coated Casing moisture content (wt. %) | 17 | 19.2 | 16.5 | 16.5 | 17.2 | 17.7 | 19.3 | 16.5 | 16.5 |
| % phase separation after 72 hours | 0 | 0 | NS** | NS** | 33% | 0 | 0 | SS* | SS* |

SS* Slight separation after 3 hours.
NS** No separation after 3 hours.

The results, as given in Table II show that casings coated with Formulations 1 and 2 of the present invention provide shirred stick coherency values, using the above described "coherency test method", of 2.95 and 4.11 inch-lbs., respectively, clearly superior to the 2.32 inch-lbs. required to break the stick coated with Comparative Formulation A employing a coating in accordance with Example II of U.S. Pat. No. 3,898,348. On the basis of coherency, casings coated with Formulations 1 and 2 are considered to provide a marked improvement over prior art Comparative Formulation A since other physical properties, including deshirr force (measured using the above described "Deshirring Force Test"), for the coated shirred sticks and coating solution stability (measured by allowing the coating solutions to stand for 72 hours and then visually checking them for percent phase separation), are comparable. Formulation 2 represents the most preferred coating formulation of the present invention.

Comparative Formulation B, which employs a coating additive that is not ethoxylated, namely sorbitan monooleate, provides an even poorer coherency result, namely 1.18 inch-lbs., than does Comparative Formulation A.

Formulation 3, which employs the coating additive of the present invention in the form of "Mazol 80 MG", as is used in Formulations 1 and 2, when used to coat casing at the level of 3.5 mg/in$^2$, provided a coated casing having a water content of 19.3 wt. % and a modal deshirr force of 0.293 lbs. for the casing stick.

In addition to the coated casing properties described in Table II above, the peelability of casing coated with Formulation 2 was compared against the peelability of casing coated with Comparative Formulation A using a high-speed automatic peeling machine. The two formulations were found to provide casings having comparable, excellent peelability.

Formulation 4 employs one of the coating additives of the present invention, that is, 0.15% of Aldosperse MS 20, a water insoluble polyoxyethylene (20) glycerol monostearate. When used to coat casing, the resulting shirred stick had a coherency value of 2.22 inch-pounds. This coherency value using the polyoxyethylene (20) glycerol monostearate coating additive is clearly superior to the 1.24 inch-pounds required to break the stick coated with Comparative Formulation C, employing a coating in accordance with U.S. Pat. No. 3,898,348. The deshirr force of 0.400 pounds for casing coated with Formulation 4, containing polyoxyethylene (20) glycerol monostearate, is acceptable and represents a slight increase over the 0.350 pounds deshirr force found with Comparative Formulation C. The slight separation observed in Formulation 4 after three hours is acceptable in the preparation of coated casings under conditions where some agitation of the Formulation is possible.

Although Formulations showing no separation after 72 hours are more preferred, coherency values and deshirr force values of casings prepared using Formulation 4 show an acceptable finished product.

Formulation 5 employs another coating additive of the present invention, 0.15% Pegosperse 400 MO, a water insoluble polyethylene glycol (400) monooleate. When used to coat casing, the resulting shirred sticks had a coherency value of 2.31. This coherency value using the polyethylene glycol (400) monooleate coating additive is clearly superior to the 1.52 inch-pounds required to break the stick coated with Comparative Formulation D employing a coating in accordance with U.S. Pat. No. 3,898,348. The deshirr force of 0.400 pounds for casing coated with Formulation 5 containing the coating additive polyethylene glycol (400) monooleate is acceptable, representing a slight increase over the 0.320 pound deshirr force found with casing coated with its Comparative Formulation D. The slight separation observed in Formulation 5 is acceptable in the preparation of coated casings. Although formulations showing no separation after 72 hours are more preferred for ease of preparation, coherency values and deshirr force measurements of casings prepared using Formulation 5 show an improved shirred sausage casing product in accordance with the teachings of this invention.

EXAMPLE 2

Following the procedure of Example 1, several additional coating formulations within the scope of the present invention were prepared having the compositions identified in Table III below. A comparative formulation, identified in Table III below as Comparative Formulation E, was prepared using "TWEEN-80" as a coating additive. Also, a control example was prepared using no coating additive.

As more fully described in Table IV below, formulations 6 to 9 of the present invention employed polyoxyethylene (5) sorbitan monooleate, polyethylene glycol (400) dilaurate, polyethylene glycol (400) monostearate, and polyethylene glycol (400) monotallate, in the form of the commercial products identified in Table IV.

In preparing the formulations described in Table III below, the procedure used was identical to that specified in Example 1 above, except that the amount of each ingredient was as specified in Table III.

Samples of commercially-produced cellulosic casing, as specified in Example 1 above, were treated with each of the formulations specified in Table III to provide an amount of 3.5 mgs. of coating composition per square inch of internal surface of casing. The samples of casing were then shirred to produce shirred coated stick lengths of about 14 inches.

The coated shirred sticks were then tested for the properties specified in Table V. These properties are defined in Example 1 above. The results are specified for tests conducted seven days after shirring, using coated sticks having moisture contents in the range between 18.5 and 21.5 wt. percent based on the total weight of the casing. The results are presented in Table V below.

TABLE III

| Component | Percent by Weight |
| --- | --- |
| Water | 66.28 |
| Propylene Glycol | 28.40 |
| Carboxymethyl-cellulose | 4.00 |
| Mineral Oil | 0.42 |
| Coating Additive | 0.90 |

TABLE IV

| Formulation | Coating Additive |
| --- | --- |
| 6 | "Glycosperse O-5"* |
| 7 | "Pegosperse 400-DL"** |
| 8 | "Pegosperse 400-MS"*** |
| 9 | "Pegosperse 400-MOT"**** |
| E | "TWEEN-80"***** |
| F | No coating additive |

*A product of Glyco Chemicals, Inc., polyoxyethylene (5) sorbitan monooleate, having an HLB of 10.0.
**A product of Glyco Chemicals, Inc., polyethylene glycol (400) dilaurate, having an HLB of 10.0.
***A product of Glyco Chemicals, Inc., polyethylene glycol (400) monostearate, having an HLB of 11.2.
****A product of Glyco Chemicals, Inc., polyethylene glycol (400) monotallate, having an HLB of 11.0.
*****A product of Atlas-ICI Chemical, polyoxyethylene (20) sorbitan monooleate, having an HLB of 15.0.

TABLE V

| Formulations | Form. 6 | Form. 7 | Form. 8 | Form. 9 | Comp. Form. E | Comp. Form. F (Control) |
| --- | --- | --- | --- | --- | --- | --- |
| Coherency (inch-lbs.) | 4.58 | 5.03 | 4.75 | 4.43 | 3.53 | 4.69 |
| Modal Deshirr force (lbs.) | .48 | .52 | .35 | .37 | .37 | .96 |
| % phase separation after 72 hours | 90 | 91 | 90 | 91 | 0 | 95 |

Among other things, the results as presented in Table V above indicate that continuous mixing or agitation of Formulations 6 through 9 should be made when coating casing with these formulations. The need for the agitation is based upon the results for percent phase separation after 72 hours of standing which ranges from 90 to 91% for these formulations. In contrast, Comparative Formulation E employing "TWEEN-80" provided no phase separation after 72 hours.

Formulations 6 through 9 show improved results as compared to Comparative Formulation E. Specifically, modal deshirr forces for shirred casing coated with each of formulations 6 through 9, ranging from 0.35 to 0.52, were well within the preferred range of less than 0.55 lbs. In contrast, Control Formulation F provided a much higher modal deshirr force of 0.96 lbs. and Comparative Formulation E provided a modal deshirr force of 0.37, comparable to the values for shirred casings coated with Formulations 6 through 9. Coherency values for casing coated with Formulations 6 through 9 and aged for seven days ranged from 4.43 to 5.03 inch-lbs. These are considered to be acceptable values, proving to be superior to the 3.53 inch-lbs. coherency value for comparative formulation E and comparable to the 4.69 inch-lbs. value for Control Formulation F.

What is claimed is:

1. A tubular cellulosic casing having a coating over the internal surface thereof, said coating comprising at least three components, including a first component being a water-soluble cellulose ether, a second component being at least one water insoluble alkylene oxide adduct of fatty acids or fatty acid partial esters, and a third component being an oil selected from the group consisting of animal and vegetable oils, mineral oil and silicone oils, said first component of said coating being present in an amount of from about 0.005 mg/in$^2$ to about 0.07 mg/in$^2$ of internal casing surface, said second component being present in an amount of from about 0.005 to about 0.1 mg/in$^2$ of internal casing surface, and said third component being present in said coating in an amount of from about 0.001 to about 3 mg/in$^2$ of casing surface, said casing being suitable for stuffing with food products and being readily peelable from food products processed therein, wherein said adduct is selected from the group of adducts represented by the formulas:

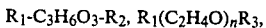

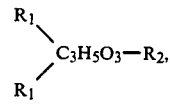

and mixtures thereof, wherein $R_1$ is a long chain fatty acid radical having 10 to 24 carbon atoms; and $R_2$ is $-(C_2H_4O)_nH$ wherein n is an integer from 1 to 40, and wherein $R_3$ is hydrogen or a long chain fatty acid radical having 10 to 24 carbon atoms.

2. The casing of claim 1 wherein said cellulose ether component of said coating is selected from the group consisting of methylcellulose, hydroxyethylcellulose, carboxymethylcellulose, carboxymethyl hydroxyethylcellulose, hydroxypropyl cellulose and hydroxypropyl methylcellulose.

3. The casing of claim 1 wherein said adduct comprises a mixture of ethoxylated monoglycerides.

4. A tubular cellulosic casing having a coating over the internal surface thereof, said coating comprising at least three components, including a first component being a water-soluble cellulose ether, a second component being at least one water insoluble alkylene oxide adduct of fatty acids or fatty acid partial esters, and a third component being an oil selected from the group consisting of animal and vegetable oils, mineral oil and silicone oils, said first component of said coating being present in an amount of from about 0.005 mg/in$^2$ to about 0.07 mg/in$^2$ of internal casing surface, and said second component being present in an amount of from about 0.005 to about 0.1 mg/in$^2$ of internal casing surface, said third component being present in said coating in an amount of from about 0.001 to about 3 mg/in$^2$ of casing surface, said casing being suitable for stuffing with food products and being readily peelable from food products processed therein, wherein said adduct is represented by the formulas:

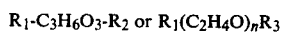

$$R_1\text{-}C_3H_6O_3\text{-}R_2 \text{ or } R_1(C_2H_4O)_nR_3$$

wherein $R_1$ is a long chain fatty acid radical having 10 to 24 carbon atoms; and $R_2$ is $\text{-}(C_2H_4O)_n H$ wherein n is an integer from 1 to 40, and wherein $R_3$ is hydrogen or a long chain fatty acid radical having 10 to 24 carbon atoms.

5. The casing of claim 1 wherein said water-soluble cellulose ether component of said coating is present in an amount of between about 0.025 and about 0.035 mg/in$^2$ of casing surface.

6. The casing of claim 1 wherein said second component of said coating is present in an amount of between about 0.005 mg/in$^2$ and about 0.027 mg/in$^2$ of casing surface.

7. The casing of claim 1 wherein said third component comprises mineral oil.

8. The casing of claim 1 wherein said third component is present in an amount of between about 0.001 mg/in$^2$ and about 0.5 mg/in$^2$.

9. The casing of claim 1 having a coherency of at least about 2.5 inch-pounds in its shirred form.

10. The casing of claim 1 wherein said casing additionally contains a polyol.

* * * * *